United States Patent [19]

Matsuno

[11] 4,127,158

[45] Nov. 28, 1978

[54] PROCESS FOR PREPARING HOLLOW METALLIC BODIES

[75] Inventor: Kenji Matsuno, Kudamatsu, Japan

[73] Assignee: Toyo Kohan Co., Ltd., Tokyo, Japan

[21] Appl. No.: 645,931

[22] Filed: Jan. 2, 1976

Related U.S. Application Data

[63] Continuation-in-part of Ser. No. 440,199, Feb. 6, 1974, abandoned.

[30] Foreign Application Priority Data

Oct. 15, 1973 [JP] Japan ............................ 48-114689
Jan. 28, 1974 [FR] France .......................... 7402714
Jan. 31, 1974 [GB] United Kingdom ............ 4614/74
Jan. 7, 1974 [DE] Fed. Rep. of Germany ..... 2400566

[51] Int. Cl.² .................................................. B01J 2/06
[52] U.S. Cl. ........................................... 164/81; 264/8
[58] Field of Search ................... 264/5, 8, 9, 10; 164/81

[56] References Cited

U.S. PATENT DOCUMENTS

| | | | |
|---|---|---|---|
| 2,189,387 | 2/1940 | Wissler | 264/10 |
| 3,617,587 | 11/1971 | Nayar | 264/8 |
| 3,719,732 | 3/1973 | Diffenbach et al. | 264/9 |
| 3,761,548 | 9/1973 | Winter | 264/8 |
| 3,829,538 | 8/1974 | Darmara et al. | 264/10 |
| 4,028,447 | 6/1977 | Talbert | 264/8 |

*Primary Examiner*—Robert F. White
*Assistant Examiner*—James R. Hall
*Attorney, Agent, or Firm*—Armstrong, Nikaido, Marmelstein & Kubovcik

[57] ABSTRACT

A method of preparing hollow metallic bodies by contacting flat droplets of a molten metal with a liquid capable of readily gasifying at a temperature lower than the melting point of said metal. Upon contact the liquid gasifies under the flat droplets and the gas pushes up the center of the flat droplets. The edges of the droplets fall because the vapor near the edges goes around the edges. As the middle of the droplets rises the surface tension of the droplets brings the edges together thereby forming the hollow metallic body.

18 Claims, 7 Drawing Figures

PROCESS FOR PREPARING HOLLOW METALLIC BODIES

BACKGROUND OF THE INVENTION

This application is a continuation-in-part of my previous application Ser. No. 440,199, filed Feb. 6, 1974, now abandoned.

1. Field of the Invention:

This invention relates to a process for the preparation of hollow metallic bodies having a thin wall.

The hollow metallic bodies formed by the process of this invention can take typically the following three structures, namely (1) a honeycomb sandwich structure, (2) a syntactic foam structure and (3) a structure in which voids in hollow metallic bodies are filled with a foamed plastic material.

These structures have a light weight and a high structural strength and are excellent in such properties as shock-absorption, heat-insulating and sound characteristics.

2. Description of the Prior Art:

In the prior art techniques of preparing hollow metallic bodies, there is known a process comprising forming a thin metal layer on a core by electroplating and removing the core (see, for example, U.S. Pat. No. 3,135,044) and a process comprising coating a thin metal layer composed of metal particles or the like on a core and then removing the core (see, for example, U.S. Pat. No. 3,674,461). Any of these known conventional processes, however, inevitably include the step of forming a thin metal layer on a core and the step of removing the core while retaining the shape of the thin metal layer, and various complicated means must be adopted for performing each of these two steps.

SUMMARY OF THE INVENTION

It is a primary object of this invention to provide a process for preparing hollow metallic bodies having a thin wall.

Another object of this invention is to provide a process in which seamless hollow metallic bodies can be instantaneously formed without employing a core.

All metals including alloys which can be melted can be used in this invention.

According to this invention, meltable metals such as, for example, iron, iron alloys, aluminum, aluminum alloys, copper, copper alloys, nickel and nickel alloys, are melted to form molten metal droplets having a suitable size, and they are contacted with a liquid capable of readily vaporizing or gasifying by evaporation or decomposition at a temperature lower than the melting point of the metal, such as water, an organic solvent and an aqueous solution of an inorganic or organic substance, whereby hollow metallic bodies can be formed. The molten metal droplets vaporize the above-mentioned liquid (hereinafter referred to merely as "liquid") upon contact therewith and the generated gas is instantaneously surrounded by the molten metal droplets to form interior voids. Then, the molten metal droplets are cooled and solidified and thus, the desired hollow metallic bodies are formed.

In this invention, the starting molten metal droplets can be formed by the following methods, namely (1) a method comprising heating a rod-like metal body or granular metal body and melting it gradually, (2) a method comprising casting a molten metal into a vessel having perforated openings and dispersing the molten metal through said perforated openings by moving the vessel or providing a difference of pressure between the inside and outside of the vessel, and (3) a method comprising letting a molten metal fall and strike an object to thereby disperse the molten metal.

The molten metal droplets thus formed in the gas are allowed to fall in a liquid while they are in the molten state, thereby contacting the liquid, or the molten metal droplets formed by dispersing a molten metal into a liquid, contact the liquid and flat metal droplets are formed. These flat metal droplets then contact the liquid and the hollow metallic bodies are formed when the liquid vaporizes and the flat droplets close around the vaporized liquid.

BRIEF DESCRIPTION OF THE DRAWINGS

This invention will now be described more detailedly by reference to the accompanying drawings, in which.

DETAILED DESCRIPTION OF THE PREFERRED EMBODIMENTS

Figure 1:
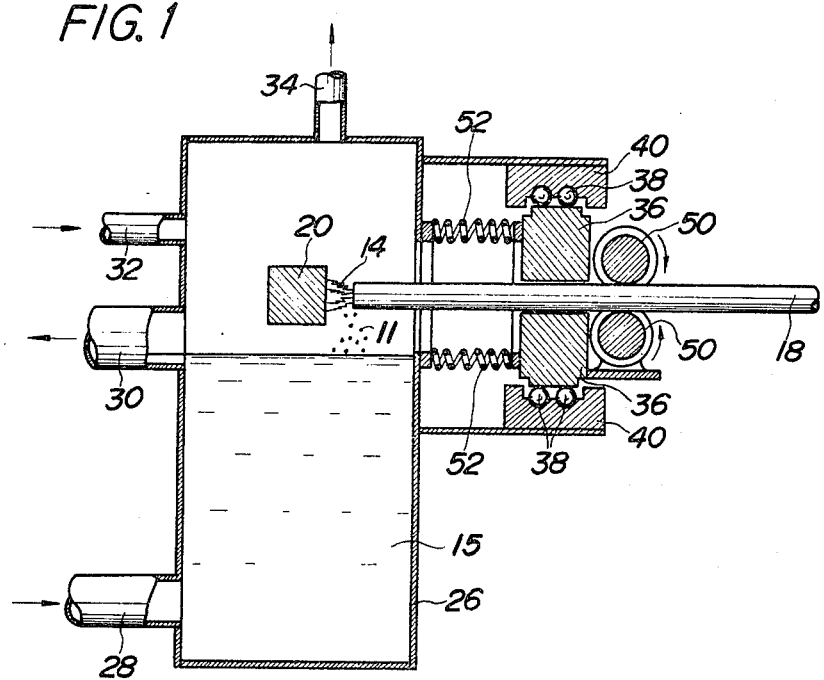
FIG. 1 is a sectional view illustrating an apparatus for use in practicing the process of this invention.

Hollow metallic bodies can be formed by contacting molten flat metal droplets with a liquid. The contact of the molten flat metal droplets with the liquid can be simply accomplished by letting the molten metal droplets fall into the liquid or by forming the molten flat metal droplets in the liquid.

When the molten metal droplets are placed in the liquid, a gas or vapor is generated by the contact between the molten metal droplets and the liquid. In order to facilitate the surrounding of the generated gas by the molten metal droplets, it is desired that the molten metal droplets have a flat form or film-like form, and it is essential that they be at a temperature sufficient to convert such flat or film-like form into a hollow granule. For facilitating the surrounding of the generated gas, it is also desired that the velocity of the molten metal droplets in the liquid be low and that a liquid stream which will violently move the molten metal droplets not be present.

When hollow metallic bodies are prepared by forming molten metal droplets in a gas and letting them fall in a liquid, if the velocity of intrusion of the molten metal droplets through the liquid surface is reduced to a low level, it is possible to obtain a desired flat or film shape in the molten metal droplets. If the velocity of the molten metal droplets in the gas is high, the velocity is reduced by allowing the bodies to collide against a barrier plate and then letting them fall into the liquid, whereby the intrusion velocity is effectively reduced and a desired flat shape can be obtained very conveniently. This barrier plate is disposed to direct the flying molten metal droplets downward upon collision thereagainst. A plate with a surface on which a liquid flows or a plate having a mechanical movement such as vibration, rotation or the like, can for example be used as the barrier plate. Adhesion of the molten metal droplets on the surface of the barrier plate is prevented by the liquid flowing on the surface of the plate or by the mechanical movement of the plate.

When molten metal droplets are formed by dispersing a molten metal in a liquid by application of external force, the resulting molten metal droplets can have a desired flat shape or film-like shape. In this case, however, liquid streams are formed in the liquid by the external force applied for dispersing the molten metal. It is possible to alter the liquid streams by provision of a barrier wall in the liquid. An assembly of rods or plates arranged in a fretwork form can be used as the barrier wall.

In preparing hollow metallic bodies within a liquid, it is very effective to provide in the liquid a plate disposed horizontally or at a slight angle to the horizontal plane, so that the molten metal droplets are allowed to collide against said plate and thus their movement is suddenly stopped and their shape flattened. Adhesion of the molten metal droplets to the plate can be prevented by vibrating or rotating the plate.

Molten metal droplets which are to be flattened can be obtained by a method comprising heating a rod-like metal body or granular metal body and melting it gradually. In this method, an electric arc, a plasma arc or a gas flame can be used as a heating means. The size of the resulting molten metal droplets can be determined by adjusting the grain size in the case of a granular metal body or by imparting such movement as vibration or rotation to a rod-like metal body.

Another method for forming molten metal droplets to be flattened comprises pouring a molten metal into a vessel having perforated openings on the side or bottom thereof, and dispersing the molten metal through said perforated openings by moving said vessel or by providing a difference of pressure between the inside and outside of the vessel. In this technique, in order to move the vessel, such movement as rotation, vibration and linear movement is given to the vessel and the molten metal is dispersed by an inertial force generated by such movement, thereby obtaining the molten metal droplets. Further, dispersion of the molten metal can also be accomplished by applying a back pressure to the molten metal in the vessel or providing vacuum on the outside of the perforated openings of the vessel. When the pressure difference is brought about between the outside and inside of the vessel in such manner, the molten metal is dispersed through the perforated openings and molten metal droplets which are to be flattened are formed.

Still another method for forming molten metal droplets to be flattened comprises applying an external force to a molten metal stream. In this case, a mechanical inertial force caused by allowing the molten metal stream to collide against a rotor, a fluid force caused by allowing a fluid to impinge against the molten metal stream to disperse the molten metal, or an electric force such as an electromagnetic force can be utilized for formation of molten metal droplets.

As the rotor for dispersing the molten metal stream, there can be employed, for example (1) a columnar rotor which may optionally have a rough surface, (2) a disc-like rotor which may optionally have a rough surface, (3) a conical rotor which may optionally have a rough surface, or (4) a bowl-like rotor.

Hollow metallic bodies prepared according to the process of the invention have a globular shape or a shape resembling a sphere, and they are generally free of seams such as welding seams in weldings. In general, all of meltable metals including alloys can be formed into hollow metallic bodies according to the process of this invention. Hollow bodies referred herein are composed of a thin wall, and the ratio of the diameter to the thickness is at least 5, preferably from 20 to 100, in these hollow bodies.

Some of the thin wall, of which the hollow bodies are composed have no openings, while a great majority of it have small openings therein.

The hollow metallic bodies prepared by the above techniques are recovered from the liquid, and then dried. When the liquid is left in the interiors of the hollow metallic bodies, they are gradually heated and dried to remove the liquid through small openings therein. When the hollow metallic bodies are composed of an iron-type alloy, hollow bodies having excellent ductility or strength characteristics can be obtained by subjecting them to a heat treatment such as annealing and decarburizing. Further, the oxidized surface of the hollow bodies can be reduced by heating them in a reducing gas atmosphere.

The process of this invention will now be illustrated more detailedly by reference to the accompanying drawing.

Figure 2:
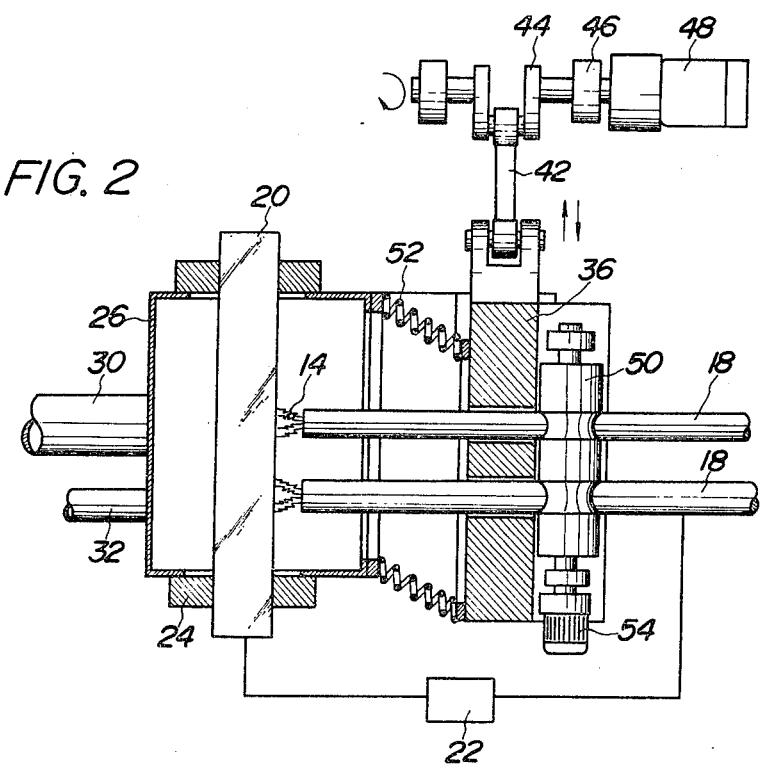
FIG. 2 is a cross-sectional view illustrating the apparatus of FIG. 1.

FIGS. 1 and 2 illustrate one embodiment of the apparatus for use in practicing the process of this invention. A consumable electrode 18 and a non-consumable electrode 20 are disposed in a closed tank 26 facing each other, and each electrode is connected to an electric source 22 by wiring and an electric arc 14 is generated between the electrodes. The consumable electrode 18 is heated by this electric arc 14 and melts. The molten metal is gradually allowed to fall into a liquid 15 below the electrodes. The distance between electrode 20 and the surface of liquid 15 is less than 800 mm and preferably in the range of about 50 mm to about 300 mm. If the liquid 15 is water, for example, its temperature is maintained below 60° C and preferably in the range of about 10° C to about 40° C. The consumable electrode 18 which is to be melted is fed by a feed roll 50 rotated and driven by a motor 54, and a certain distance is maintained between the consumable electrode 18 and the non-consumable electrode 20 so that an electric arc 14 is continuously formed. The non-consumable electrode 20 is composed of a substance, the consumption of which is much smaller than that of the consumable electrode 18, such as tungsten and the like. The non-consumable electrode 20 is disposed as a fixed electrode, both ends of which are supported by insulators 24.

The consumable electrode 18 is supported by a movable member 36 capable of reciprocating movement in the horizontal direction, and the electrode 18 is moved reciprocatingly with respect to the non-consumable electrode 20. The upper and lower ends of the movable member 36 are supported by a fixing section 40 through bearings 38. The mobile member 36 is connected to a motor 48 through a connecting rod 42 and a crank shaft 44, whereby the rotary movement of the motor 48 can readily be converted to a linear movement of the mobile member 36.

The inside of the tank 26 is shielded from the outer atmosphere, and a shield gas is introduced into the tank 26 from an inlet pipe 32 and the interior of the tank 26 above the level of a liquid 15 is filled with the shield gas. The movable member 36 is connected to the tank 26 by means of a flexible joint 52 to shield the assembly from the outer atmosphere. This shield gas is used in the tank to stabilize formation of the electric arc 14. The liquid 15 is circulated by means of an inlet pipe 28 and an overflow pipe 30 to maintain the liquid level constant and recover the hollow metallic bodies floating thereon.

Molten metal droplets 11 are formed from metal rods 18. The droplets 11 which separate from the rods 18 have spherical or irregular shapes. The droplets 11 are carried toward the electrode 20 by the flow of electric arc 14, and impinge against the electrode 20. Upon impinging against the electrode 20, the droplets are flattened instantly. While the flattened droplets separate from the electrode 20 and fall downward, their surface area becomes small due to surface tension, their shape becomes small due to surface tension, and thus their shape becomes spherical, flat or irregular. The droplets 11 which are formed in the electric arc 14 have a high temperature at about 2000° C and high liquidity. When the droplets 11 fall at a low speed and strike the surface of liquid 16, the droplets are spread and flattened instantaneously.

When the droplet is flattened and falls downwardly in the liquid 15, it is surrounded by vapor, generated from the liquid 15. The vapor tries to rise upwardly in the form of bubbles, while the droplet tries to move downward in the liquid due to gravity. When the bubbles of vapor which are generated under the droplet try to rise upwardly, they are obstructed by the flattened droplet, and the droplet is thereby pushed upwardly by the rising bubbles. When the bubbles of vapor which are generated on the droplet separate from the droplet and rise upwardly, the droplet is also drawn upwardly by the rising bubbles. The bubbles which are generated under the edge part of the flattened droplet can pass around the outside of the flattened droplet, however, the bubbles which are generated at the center of the flattened droplet are held under the droplet and thus the central part of the flattened droplet is pushed upwardly by the rising bubbles beneath it.

The droplet, which remains in a molten state, is rounded by the action of surface tension. Namely, the edge part of droplet which is flattened moves toward the center of droplet. Thus, as the central part of droplet moves upwardly by the action of rising bubbles and the edge part of droplet moves toward the center of droplet, the flattened droplet surrounds the bubbles and/or the liquid thereby forming a hollow body. The changing of the flattened droplet into the hollow body occurs in a very short period of time.

The size of molten metal droplets 11 formed by the melting of the consumable electrode 18 can be controlled by changing the velocity of the reciprocating movement of the consumable electrode 18. Further, the falling velocity of the molten metal droplets 11 into the liquid 15 positioned below can be reduced by the reciprocating movement of the consumable electrode. Thus hollow metallic bodies having a thin wall can be formed in the liquid 15. The size of the hollow metallic bodies is generally in the range of from 0.1 mm to about 8 mm.

Figure 3:
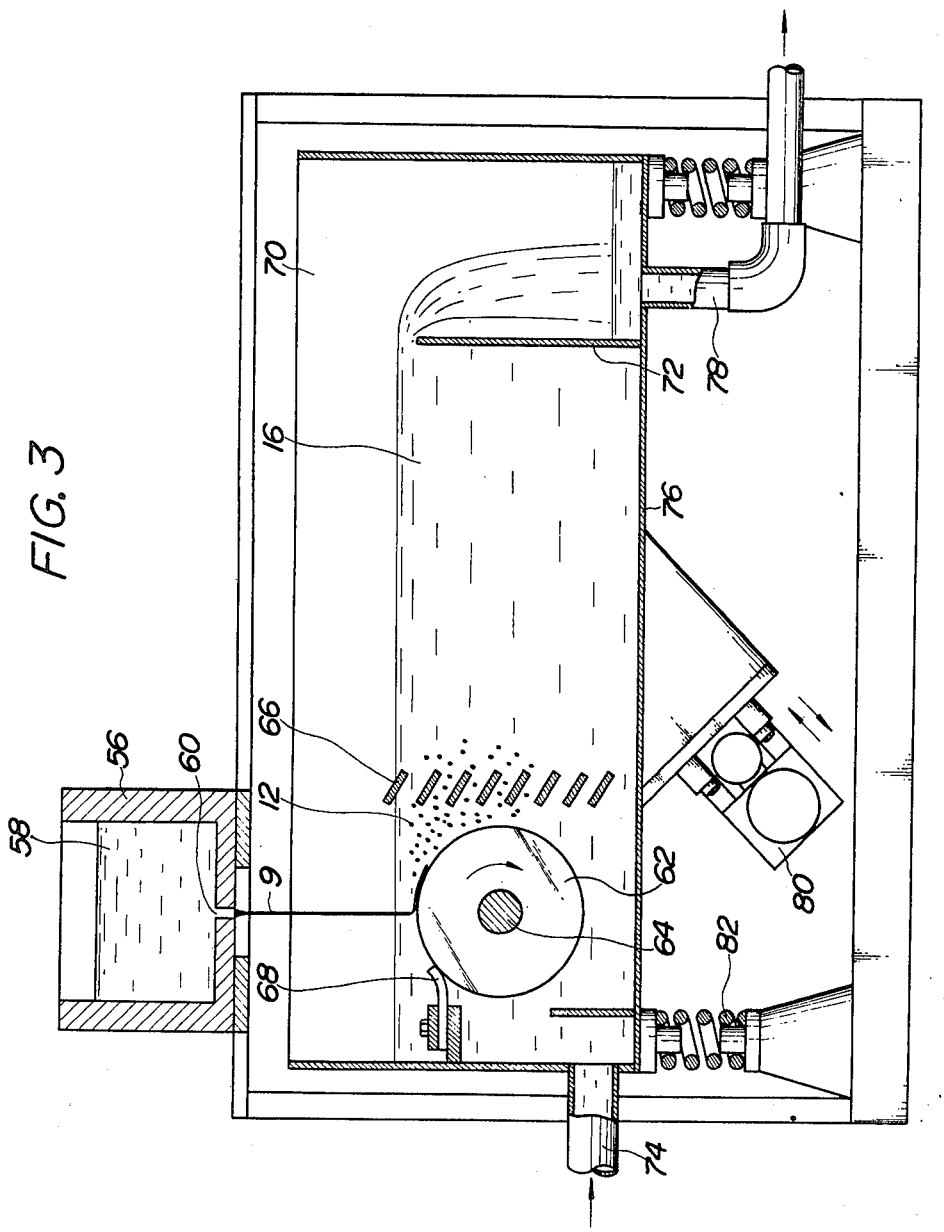
FIG. 3 is a sectional view illustrating another apparatus for use in practicing the process of this invention.

In FIG. 3 illustrating another embodiment of the apparatus for use in practicing the process of this invention, molten metal 58 in a tundish 56 is allowed to fall from a bottom opening 60 of the tundish 56 in the form of a molten metal stream 9. The temperature of the molten metal 58 is maintained in the range of from about 50° C to about 500° C above the melting point of the metal and the diameter of columnar stream 9 is generally between 4 mm and 10 mm. A liquid 16 is introduced into the tank 70 from an inlet pipe 74, flows over a weir 72 and is discharged from a discharge pipe 78. The temperature of liquid 16 is maintained at a low temperature. If for example water is used, it is maintained below 60° C and preferably in the range of about 10° C to about 40° C. A columnar rotor 62, in the liquid 16, is rotated in the direction indicated by the arrow about a horizontally disposed shaft 64 which is the rotation center. The rotor 62 generally rotates at a speed of between 400–1200 rpm and has a diameter of between 50–200 mm. The molten metal stream falling into the liquid 16 impinges against the columnar rotor 62 and is dispersed into the liquid 16 to form molten metal droplets. The distance between opening 60 and the surface of liquid 16 is maintained below 1 m and preferably in the range from 0.4 m to about 0.6 m, while the distance between the surface of liquid 16 and rotor 62 is less than 150 mm and preferably less than about 50 mm.

The columnar stream 9 of molten metal arrives at the top of rotary rotor 62 without dispersion, and is then dispersed by the centrifugal force caused by rotation of rotor 62. Before the dispersion, the columnar stream 9 of molten metal impinges upon the surface of rotor 62 and moves along the surface of rotor 62 a very short distance, whereby the columnar stream is spread and flattened to form a flat stream of molten metal upon the surface of rotor 62. The flat stream is then dispersed into droplets having a flat form. Thus, the droplets 12 which are formed and ejected from the rotor 62 are substantially flat droplets. After the droplet is flattened, it remains in the molten state and it is rounded by the action of surface tension. When the flattened droplet is rounded in the liquid 16, the droplet surrounds a little liquid and/or vapor to form a hollow body.

Liquid streams generated by rotation of the columnar rotor 62 often cause the acceleration of the molten flat metal droplets and have undesired effects on formation of hollow metallic bodies. Accordingly, in order to reduce the liquid streams, a barrier wall composed of inclined plates 66 is disposed in front of the columnar rotor 62 at a distance of between 10–200 mm and preferably in the range from about 10 mm to about 50 mm. In addition, a flexible scraper 68 is provided to reduce the liquid streams. When molten metal droplets 12 are formed by dispersing the molten metal stream 9 by means of the above-mentioned columnar rotor 62, molten metal droplets traveling through the liquid in a direction approximating the horizontal direction can readily be made to have a flat shape or filmy shape, which can then be easily made hollow and granulated to form hollow metallic bodies, but molten metal droplets accelerated downwardly along the surface of the columnar rotor 62 by its rotation fall in the liquid in a spherical form or string-like form. When a bed plate 76 of the tank 70 is disposed in the vicinity of the columnar rotor 62, the molten metal droplets falling in the spherical form or string-like form can be stopped by the bed plate 76 and their form can be converted to a desired flat or filmy shape. In this case, a small vibration in an oblique direction is given to the bed plate 76 to advance it smoothly to the weir 72, so that it prevents adherence of the molten metal droplets, facilitates formation of granular hollow metallic bodies and prevents agglomeration of the molten metal droplets. The small vibrations can be obtained by supporting the tank 70 by springs 82 and mounting a vibrating motor 80 obliquely on the bed plate 76. The movement of the molten metal droplets 12 on the bed plate 76 is identical with the movement of a substance fed on a conventional vibrating feeder.

Figure 4:
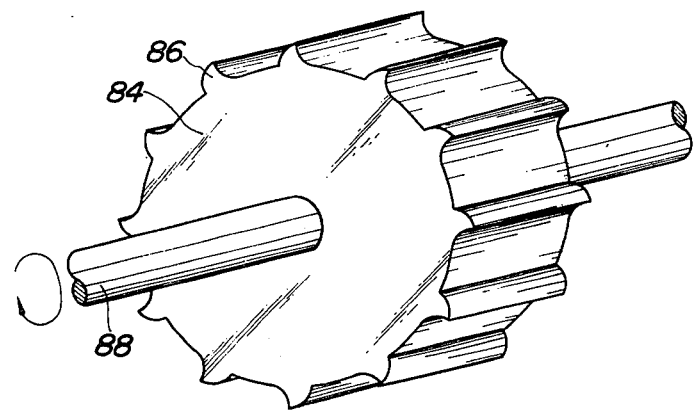
FIG. 4 is a perspective view showing another embodiment of a rotor to be used in the apparatus of FIG. 3.

An example of the rotor to be used for dispersing a molten metal stream in the apparatus shown in FIG. 3, is illustrated in FIG. 4. The rotor 84 has a columnar shape and has nail-like projections 86 on the surface thereof. When this rotor 84 is attached to the apparatus shown in FIG. 3, the direction of flow of the molten metal droplets in the liquid is almost horizontal, and the amount of the molten metal accelerated downwardly is reduced substantially, with the result that the intended hollow metallic bodies are effectively formed.

Figure 5:
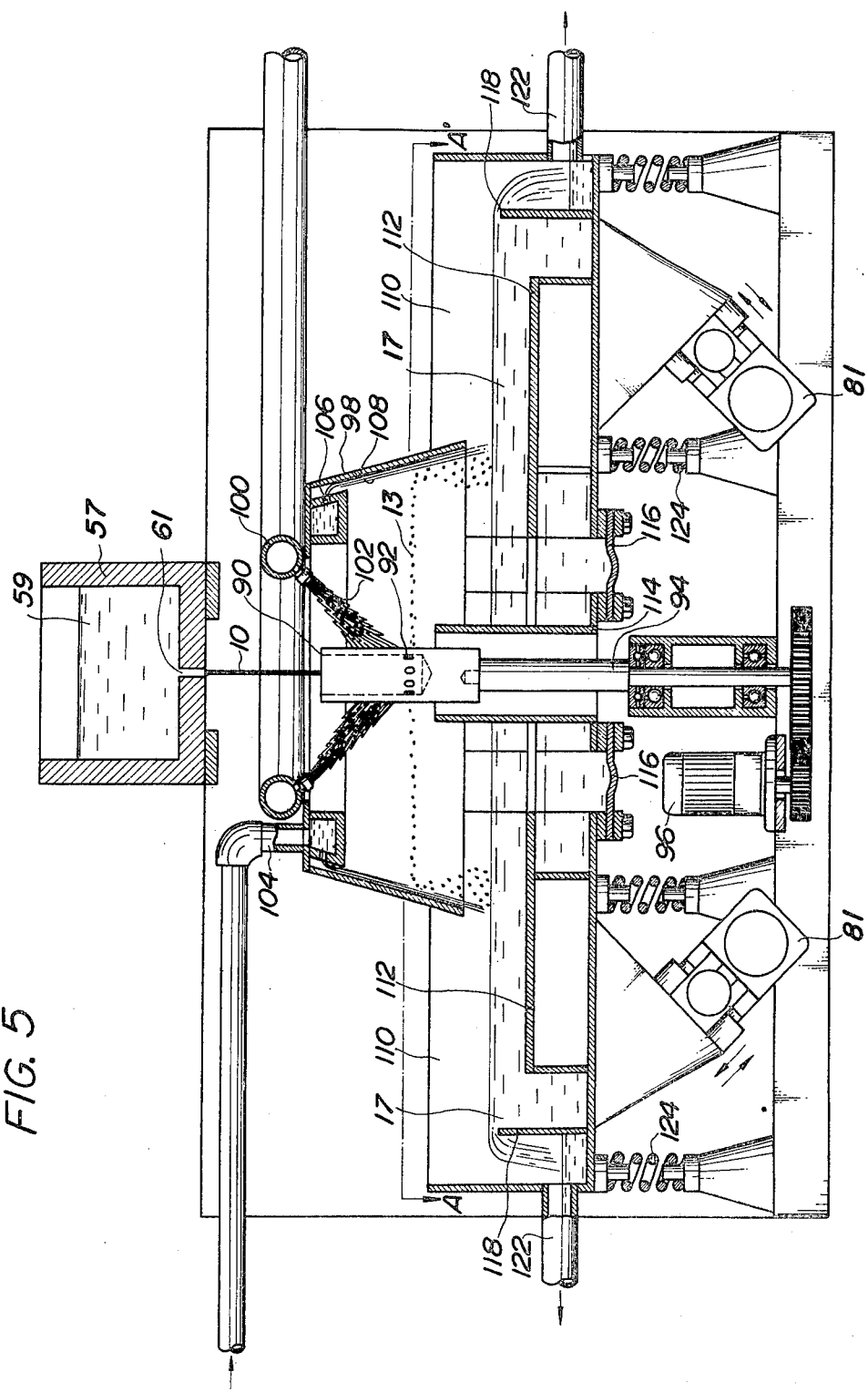
FIG. 5 is a sectional view illustrating still another apparatus for use in practicing the process of this invention.
Figure 6:
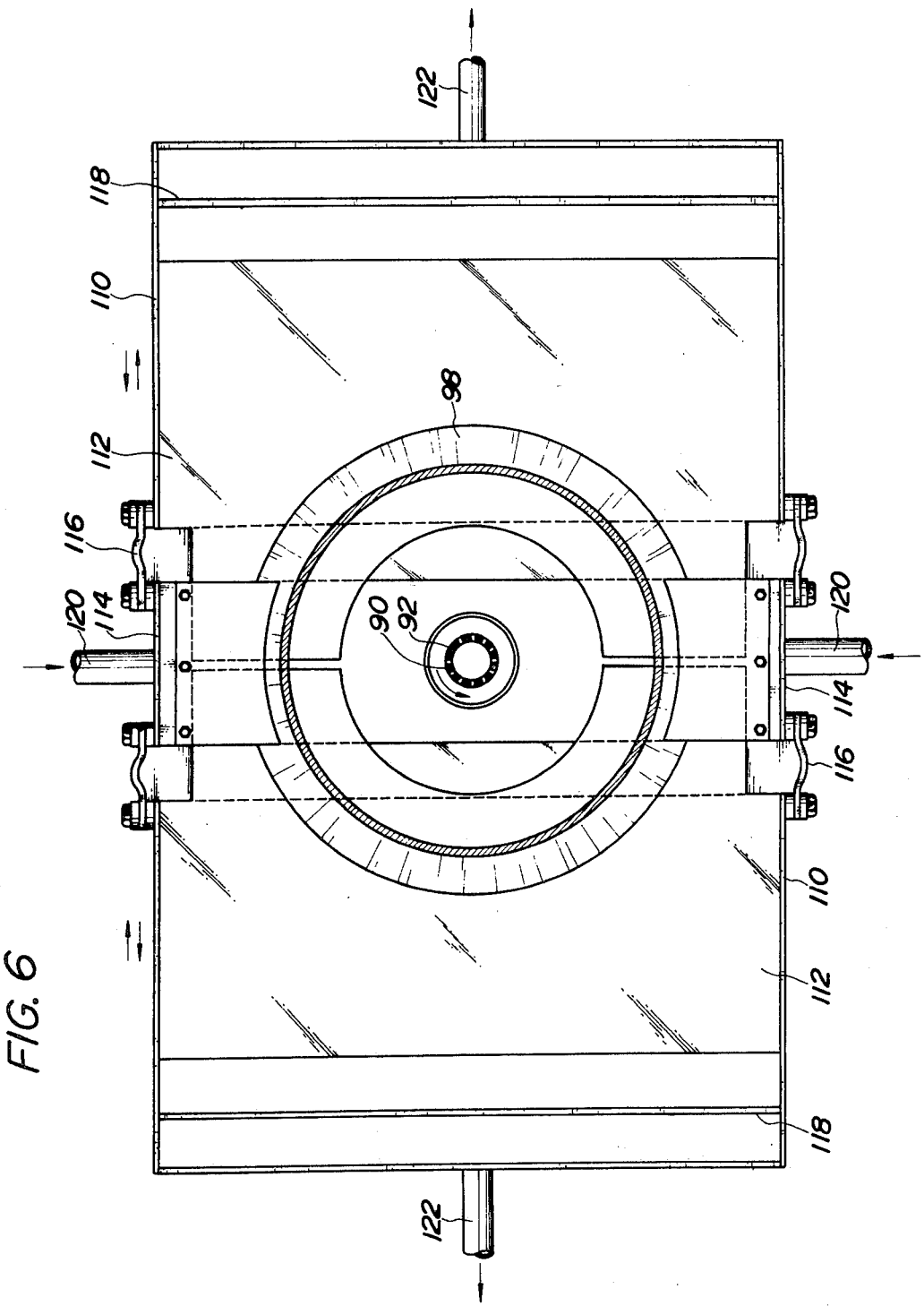
FIG. 6 is a cross-sectional view taken along the line A—A' of the apparatus of FIG. 5.

Another embodiment of the apparatus for use in practicing the process of this invention is illustrated in FIGS. 5 and 6. In reference to FIGS. 5 and 6, a molten metal 59 placed in a tundish 57, falls from a bottom opening 61 of the tundish 57 in the form of a molten metal stream and is introduced into a pot 90. The pot 90 is rotated by a motor 96, and due to the centrifugal force caused by the rotation of the pot 90, the molten metal in the pot 90 is dispersed through perforated openings 92 and expelled from the pot in the form of molten metal droplets of a spherical or elongated shape. The pot 90 is heated by a flame 102 of a gas burner 100 to prevent solidification of the molten metal and clogging of the perforated openings 92 and to maintain the temperature of the molten metal between the melting point and 500° C above the melting point. With aluminum and aluminum alloys, the temperature of the molten metal is between the melting point and 200° C above the melting point. A barrier plate composed of a conical plate 98 is disposed around the periphery of the rotary pot 90. The angle of the barrier 98 with the vertical is less than 45° and preferably between 5° and 20°. Fluid is carried to nozzle opening 106 by pipe 104. A fluid stream 108 which is discharged from nozzle openings 106 and a spray pipe 104 uniformly flows on the plate 98. Water curtain 108 which is at about room temperature is used for preventing the adhesion of droplets 13 to the barrier 98. Further, since the water 108 is vaporized by heat of droplets 13 impinging against the barrier 98, the droplets 13 are substantially prevented from direct contact with the metal surface of barrier 98. Due to the interference of vapor which has a low thermal conductivity, the droplets 13 do not solidify as might occur by direct contact between the droplets and the cooled metal surface. Water curtain 108 which has a thickness of less than 3 mm and preferably between about 0.2-1 mm, must flow slowly. The head of water 108 discharged from nozzle openings 106 of the spray pipe 104 is generally below 200 mm in an aqueous column, and preferably below about 50 mm in an aqueous column. The velocity of water curtain 108 which was calculated is thus below about 140 cm/sec, preferably about 70 cm/sec.

Molten metal droplets 12 expelled from the perforated openings 92 of the rotary pot 90 impinge against the conical plate 98 acting as the barrier plate, and the velocity of the molten metal droplets 13 is reduced and the molten metal droplets 13 are allowed to fall downwardly into liquid 17 without adhering to the barrier 98 due to the fluid 108 flowing downwardly on the surface of the barrier 98. The distance between the point of impact of a droplet 13 on barrier 98 and the surface of liquid 17 is less than 800 mm and preferably about 100-500 mm.

The tank in which the liquid 17 is contained is divided into a fixed section 114 and vibrating sections 110 disposed on both side ends. The vibrating and fixed sections 110 and 114 are connected and sealed by flexible sheets 116. Two terminal vibrating sections 110 are supported by spring 124 and they repeat oblique vibrations propagated in directions opposite to each other, which are caused by the vibrating movement of vibrating motors 80 attached obliquely on the bed plate of the tank. The small vibration of each vibrating section is absorbed by the flexible sheets 116 and it is not transmitted to the fixed section 114. The liquid 17 is introduced into the tank from inlet pipes 120, flows over weirs 118 and is withdrawn from discharge pipes 122. The temperature of liquid 17 is maintained at a low level. When water is used, it is maintained below 60° C and preferably in the range of about 10° C to about 40° C.

Molten metal droplets 12 coming out of the rotary pot 90 impinge against the barrier 98 and the droplets are flattened by impact on the barrier 98. The flattened droplets become small instantaneously due to the surface tension. A large majority of droplets maintain their flat shape, and then fall downward into liquid 17. A few of the droplets are made into hollow bodies. The droplets which fall into the liquid 17 remain in a molten state and are flattened by striking the surface of liquid in the manner described above in the first embodiment.

Two horizontal plates 112 attached to the vibrating sections 110 are disposed in the liquid, and from these plates 112 small vibrations are continuously, obliquely propagated. The falling molten metal droplets 13 which pass through the liquid 17 are further flattened by the plates 112 to give the desired flat or filmy shape, and they are formed into hollow metallic bodies without adhering to the plates 112 because of the vibration thereof. When the droplets are flattened on the pipe 112 disposed in the liquid 17, a film-like liquid is left between the flattened droplet and plate 112, and it is vaporized instantly by the heat of droplet. Due to the expansion of liquid between the droplet and plate 112 caused by changing liquid into gas, the droplet is pushed upwardly at its center. The edge part of droplet is not affected by the expansion of liquid. After the droplet is flattened on the plate 112, it begins to contract itself by the action of surface tension. Namely, the edge part of droplet which is flattened moves toward the center of droplet. Since the edge part of the droplet moves toward the center and along the plate 112, and the central part of droplet moves upwardly, the edge part of droplet can easily move to the base center of the droplet. Thus, when the flattened droplet contracts itself, it surrounds the vapor and/or a little liquid which exist between the flattened droplet and plate 112, thereby forming a hollow body. The formation of the hollow body is performed in a very short time. In a large aluminum droplet, having a weight of 5 g, for example, time for changing the flattened droplet into the hollow body is about 0.03 seconds.

The molten metal droplets which thus arrive at the plates 112 are moved toward weirs 118 by the small vibration of the plates 112, and the melt adhesion to another molten metal droplets which arrive at the plates 112 at the later stage is thus prevented.

In the same manner as described above, hollow bodies can be formed on the barrier 98 on which liquid curtain 108 flows. But the quantity of hollow bodies which are formed on the barrier 98 is very small. When a hollow body which is formed still has a high liquidity, vapor which exists in the hollow body can easily escape from the body by the action of the floating power of the vapor, or by the break of the liquid metal shell caused by expansion of vapor. Namely, vapor which is enclosed in a droplet having a high liquidity breaks the wall and then passes through the break in the wall. It can be seen that as the vapor passes through the break in the wall of the droplet or the droplet fails to surround the vapor, hollow bodies are not formed on the barrier 98.

Figure 7:
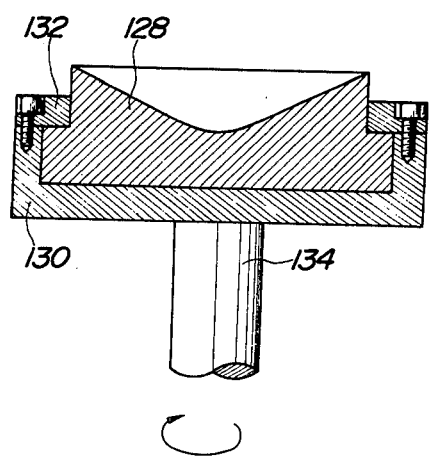
FIG. 7 is a sectional view illustrating another embodiment of a rotor to be used in the apparatus shown in FIG. 5.

A bowl-like rotor 126 to be used for dispersing the molten metal in the apparatus shown in FIG. 5 is illustrated in FIG. 7. The bowl-like rotor 126 is composed of a body 128, a holder 130 and a support plate 132. When this bowl-like rotor 126 is employed, the molten metal stream collides against the body 128 of the rotor 126, and is dispersed by a centrifugal force generated by rotation to form molten metal droplets. Then, the so formed molten metal droplets are allowed to fall into the liquid, and the intended hollow metallic bodies are formed.

In all of the embodiments disclosed, the flattened droplets which contact with the liquid are rounded by the surface tension, and then surround vapor and/or liquid, thereby forming the hollow body. In order to form hollow bodies, the droplets must have a proper liquidity. When the liquidity of droplets is too high, vapor only passes through the droplets. And when the liquidity of droplets is too low, the droplets cannot change their forms. Therefore, in molten aluminum which has a high liquidity, for example, the temperature of molten metal 59 in the tundish 57 must be maintained to below 200° C above the melting point of metal, preferably below 50° C above the melting point. In molten copper, the temperature of molten metal 59 in the tundish 57 must be maintained to between 100° C and 500° C above the melting point, preferably between 200° C and 400° C above the melting point. Further in molten nickel, the temperature of droplets is maintained to high levels by heating them in an electric arc.

This invention will now be illustrated more detailedly by reference to Examples.

EXAMPLE I

An apparatus such as shown in FIGS. 1 and 2 was employed. A nickel rod having a diameter of 4 mm was disposed as a consumable electrode facing a non-consumable electrode composed of carbon, and an electric arc was generated between both the electrodes. The nickel electrode was reciprocated at a stroke of 15 mm and a frequency of 120 cycles per minute. Argon gas filled the space in a closed tank above the water in the lower portion of the tank. The water was continuously circulated and the water level was so adjusted that the distance between the nickel rod and water level was always maintained at 75 mm. The nickel rod was heated and melted by the electric arc, and the dispersed melt of molten nickel droplets of spherical shape having a diameter of 0.7-4mm fell on the water surface which was at room temperature and introduced therein to form hollow bodies of nickel. The resulting hollow bodies had a spherical shape with a diameter of 2 to 8 mm and the bulk density of the product could be reduced to 0.4 g/cm$^3$ in this Example.

EXAMPLE II

Procedures of Example 1 were repeated by employing a rod of nickel-iron alloy instead of the nickel rod. The Ni-Fe alloy used had a composition of 0.7% of C and 45% of Ni, the balance being Fe. As a result, hollow bodies of the Ni-Fe alloy having a spherical shape of a diameter of 1 to 10 mm, and the bulk density of the product could be reduced to 0.35 g/cm$^3$ in this Example.

EXAMPLE III

An apparatus such as shown in FIG. 3 was employed. Cast iron was melted at 1550° C. and charged in a tundish, and a molten iron stream having a diameter of 5 mm was allowed to fall from a bottom opening of the tundish into a tank. The distance between the opening and surface of the water was 500 mm. The tank was filled with water at room temperature, and a columnar rotor of an outer diameter of 180 mm having 12 nail-like projections, such as shown in FIG. 4, was driven and rotated at a rate of 800 rpm in the water. The rotor was 20 mm below the surface of the water. A vibrating motor giving a vertical vibration was mounted on the bed plate of the tank with an inclination of 45° to the horizontal plane, whereby the bed plate of the tank was vibrated in the direction of 45° at a frequency of 30 cycles per second at an amplitude of about 3 mm. The molten iron stream was dispersed in water by means of the rotor to form hollow bodies of cast iron having a spherical shape of a diameter of 0.3 to 1 mm. The bulk density of the product could be reduced to 0.5 g/cm$^3$ in this Example. The composition of the hollow bodies was 4.2% of C and 2.0% of Si, the balance being iron.

The hollow bodies of cast iron were wrapped with powder of ferrous oxide and heated at 1000° C for 1 hour to effect decarburization, and then reduction was carried out by heating them in a hydrogen gas at 800° C for 30 minutes. The composition of the resulting hollow bodies was 0.1% of C and 2.0% of Si, the balance being Fe. By these post heat treatments, iron type hollow bodies rich in ductility and having a metallic gloss on the surface could be obtained.

EXAMPLE IV

An apparatus such as shown in FIG. 5 was employed. Aluminum was heated at 700° C and molten aluminum was charged in a tundish. The aluminum melt was allowed to fall from a bottom opening of the tundish in the form of a molten aluminum stream having a diameter of 5 mm. The molten aluminum stream was thus introduced into a pot having an outer diameter of 60 mm which was heated by a gas flame to about 700° C. The pot had perforated openings of a diameter of 5 mm on the side wall thereof. Water was placed in a tank, and vibrating sections disposed on both ends of the tank were vibrated at a frequency of 30 cycles per second and an amplitude of about 2 mm. The vibrations were propagated in the directions opposite to each other at an angle of 45° with respect to the horizonal plane. The pot was rotated at about 620 rpm and the aluminum melt was expelled through the perforated openings by the centrifugal force and impinged against to a conical plate at a distance of about 120 mm, following which it fell into the water below. A water curtain at room temperature and of about 1 mm in thickness flowed over the barrier which was at an angle of 1.5° with the vertical.

The droplets which passed through the water and struck a plate 20 mm below the surface, were further flattened and then formed the hollow metal bodies. The so formed hollow bodies were moved toward weirs while being prevented from adhering to newly formed bodies by virtue of the small vibration. The resulting hollow bodies of aluminum had a spherical or substantially spherical form of a diameter of 3 to 8 mm. In this Example, the bulk density of the product could be reduced to 0.3 g/cm$^3$.

EXAMPLE V

A rotor shown in FIG. 7 was attached to the apparatus of FIG. 5 instead of the pot shown in FIG. 5, and employed in this Example. Copper was melted at 1300° C and was charged into a tundish and allowed to fall from a bottom opening of the tundish in the form of a molten copper stream of a diameter of 5 mm onto a bowl-like rotor rotating at a rate of 800 rpm. The molten copper stream was dispersed by rotation of said bowl-like rotor to form molten bodies of copper. In the same manner as described in Example III, the molten bodies of copper were made hollow and granulated. The resulting hollow bodies of copper had a spherical form having a diameter of 3 to 6 mm. In this Example, the bulk density of the product could be reduced to 0.6 g/cm$^3$.

What is claimed is:

1. A process for forming hollow metallic bodies comprising:
    (a) forming a columnar stream of molten metal, the temperature of which is in the range of 50° C to 500° C above the melting point of the metal;
    (b) directing said stream into a liquid, wherein the temperature at which liquid vaporizes is lower than the temperature of the molten metal;
    (c) forming flat molten metal droplets by impinging said molten columnar stream against a rotating rotor means which is disposed at a depth of less than 150 mm from the surface of said liquid such that the columnar stream is spread and flattened to form a flat stream and dispersing the flat stream in the form of flat droplets as the result of the centrifugal force caused by the rotation of said rotor means wherein the flat droplets have sufficient thermal energy to convert the flat droplets into said hollow metallic bodies; and
    (d) vaporizing the liquid below said flat molten droplets as a result of the contact of the flat molten droplets and the liquid whereby hollow metallic bodies are formed as the vapor pushes up the central portion of said flat molten droplets and edges come together due to the surface tension of the molten droplet.

2. The process of claim 1, wherein the distance between the surface of said liquid and said rotor means is less than 50 mm.

3. The process of claim 1, wherein said rotor means rotates at a speed in the range of 400 rpm to 1200 rpm.

4. The process of claim 1, wherein the length of said columnar stream of molten metal falling in an atmosphere is less than 1 m.

5. The process of claim 4, wherein the length of said columnar stream of molten metal falling in an atmosphere is in the range of 0.4 m to 0.6 m.

6. The process of claim 1, wherein the temperature of the liquid is less than 60° C.

7. The process of claim 1, wherein the temperature of the liquid is in the range of 10° C to 40° C.

8. A process for forming hollow metallic bodies comprising:
    (a) forming a plurality of molten metal droplets, the temperature of which is in the range of 0° C and 500° C above the melting point of the metal;
    (b) allowing said molten droplets to fall from a height of less than 800mm towards the surface of a liquid, wherein the temperature at which the liquid vaporizes is lower than the temperature of said molten droplets;
    (c) forming flat molten droplets by allowing said molten droplets to fall through said liquid and to strike a plate positioned below the surface of said liquid said plate causing said droplets to flatten wherein the droplets have sufficient thermal energy to convert the flat droplets into said hollow metal bodies; and
    (d) vaporizing the liquid below said flat molten droplets as a result of the contact of said flat molten droplets and said liquid whereby hollow metallic bodies are formed as the vapor pushes up the central portion of said flat molten droplets and the edges come together due to the surface tension of the molten metal.

9. The process of claim 8, wherein said molten droplets are formed by rotating a pot having molten metal therein and ejecting the molten metal through perforated openings in said pot in substantially horizontal directions, and impinging said molten droplets against a barrier wall and allowing said barrier wall to direct said molten droplets downwardly thereby allowing said molten droplets to fall towards the surface of the liquid.

10. The process of claim 9, including preventing said molten droplets from adhering to said barrier wall.

11. The process of claim 10, wherein preventing said molten droplets from adhering to said barrier wall comprises forming a water curtain on the surface of said barrier wall.

12. The process of claim 11, wherein the thickness of said water curtain is less than 3 mm.

13. The process of claim 8, including preventing said molten droplets from adhering to said plate.

14. The process of claim 13, wherein preventing said molten metal droplets from adhering to said plate comprises vibrating said plate.

15. The process of claim 8, wherein the distance between the surface of the liquid and the plate is less than 100 mm.

16. The process of claim 15, wherein the distance between the surface of the liquid and the plate is in the range of 10 mm to 40 mm.

17. The process of claim 8, wherein the temperature of said liquid is less than 60° C.

18. The process of claim 17, wherein the temperature of said liquid is in the range of 10° C to 40° C.

* * * * *